(12) United States Patent
Hamada et al.

(10) Patent No.: US 8,922,622 B2
(45) Date of Patent: Dec. 30, 2014

(54) IMAGE PROCESSING DEVICE, IMAGE PROCESSING METHOD, AND PROGRAM

(75) Inventors: Toshiya Hamada, Saitama (JP); Tatsumi Sakaguchi, Kanagawa (JP); Naohisa Kitazato, Tokyo (JP); Mitsuru Katsumata, Tokyo (JP); Hiroyuki Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 580 days.

(21) Appl. No.: 12/965,127

(22) Filed: Dec. 10, 2010

(65) Prior Publication Data

US 2011/0157307 A1    Jun. 30, 2011

(30) Foreign Application Priority Data

Dec. 28, 2009  (JP) ................ P2009-297546

(51) Int. Cl.
*H04N 13/00*   (2006.01)
(52) U.S. Cl.
CPC ........... *H04N 13/007* (2013.01); *H04N 13/004* (2013.01)
USPC ............................................ 348/43; 348/468
(58) Field of Classification Search
USPC ............ 704/211; 375/240; 348/43, 468, E13, 348/E13.02, E13.06, E13.07, E13.033; 725/109, 110, 22, 38, 139
See application file for complete search history.

(56) References Cited

U.S. PATENT DOCUMENTS

| 6,574,423 B1* | 6/2003 | Oshima et al. ................. 386/329 |
| 2009/0220213 A1* | 9/2009 | Ogawa et al. ................... 386/95 |
| 2009/0315979 A1* | 12/2009 | Jung et al. ........................ 348/43 |

FOREIGN PATENT DOCUMENTS

JP           10-327430         12/1998

* cited by examiner

*Primary Examiner* — Jay Patel
*Assistant Examiner* — Reza Aghevli
(74) *Attorney, Agent, or Firm* — Finnegan, Henderson, Farabow, Garrett & Dunner, L.L.P.

(57) ABSTRACT

A processing device for adding a subtitle to a three-dimensional (3D) image produced by left-eye and right-eye display patterns displayed on a display is disclosed. The processing device may include a video decoder configured to receive video content data representing content left-eye and content right-eye display patterns. The processing device may also include an audio decoder configured to receive sound data indicative of an audio volume level. Additionally, the processing device may include a subtitle decoder configured to receive subtitle data indicative of a subtitle display pattern, and modify the subtitle data based on the sound data. The processing device may also include a superimposition unit configured to combine the modified subtitle data with the video content data to create combined pattern data representing combined left-eye and combined right-eye display patterns.

11 Claims, 8 Drawing Sheets

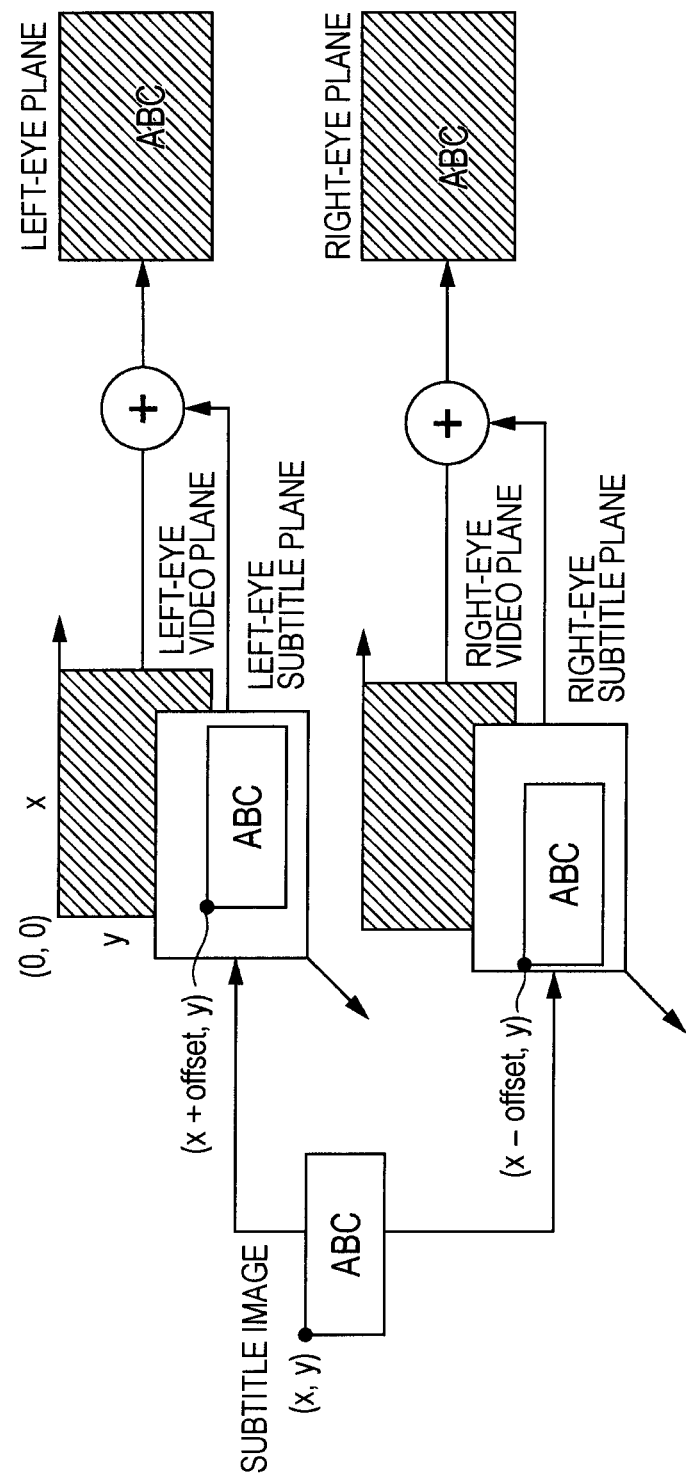

IMAGE PROCESSING DEVICE, IMAGE PROCESSING METHOD, AND PROGRAM

CROSS-REFERENCE TO RELATED APPLICATION

This application claims priority of Japanese Patent Application No. 2009-297546, filed on Dec. 28, 2009, the entire content of which is hereby incorporated by reference.

BACKGROUND

1. Technical Field

The present disclosure relates to an image processing device, an image processing method, and a program, and particularly relates to an image processing device, an image processing method, and a program that enable display of a sub-image such as a 3D subtitle with increased effect.

2. Description of the Related Art

While contents such as motion pictures mainly use 2D images, 3D images have been attracting attention in recent years.

As a reproduction device that reproduces a 3D content, there has been a device that combines and displays a main image of a 3D motion picture or the like with a 3D subtitle image. Note that, herein, a subtitle image refers to an image having a rectangular region including an entire subtitle to be displayed in one screen.

Such a reproduction device combines a main image for left eye with a subtitle image for left eye so as to be displayed on a screen for left eye, and combines a main image for right eye with a subtitle image for right eye so as to be displayed on a screen for right eye.

Specifically, when left-eye subtitle data, including image data of the subtitle image for left eye and a display position (Lx, Ly) of an upper left corner of the subtitle image on an x-y coordinate system on a screen, and right-eye subtitle data, including image data of the subtitle image for right eye and a display position (Rx, Ry) of an upper left corner of the subtitle image on an x-y coordinate system on a screen, are inputted, the reproduction device generates a left-eye subtitle plane which is image data of a screen in which the subtitle image for left eye is arranged in the display position (Lx, Ly) based on the left-eye subtitle data and generates a right-eye subtitle plane which is image data of a screen in which the subtitle image for right eye is arranged in the display position (Rx, Ry) based on the right-eye subtitle data, as shown in FIG. 1.

Then, as shown in FIG. 1, the reproduction device superimposes the left-eye subtitle plane on a left-eye video plane which is image data of a screen of the main image for left eye to generate a left-eye plane which is image data of the screen for left eye. Also, as shown in FIG. 1, the reproduction device superimposes the right-eye subtitle plane on a right-eye video plane which is image data of a screen of the main image for right eye to generate a right-eye plane which is image data of the screen for right eye.

On the other hand, when 2D display subtitle data including image data of a subtitle image for 2D display and a display position (x, y) of an upper left corner of the subtitle image on an x-y coordinate system on a screen is inputted, the reproduction device first generates, as the left-eye subtitle plane, image data of a screen in which the upper left corner of the subtitle image for 2D display is arranged in a position (x+offset, y) shifted from the display position (x, y) in the positive direction of x-coordinate by an offset amount "offset", as shown in FIG. 2. Then, the reproduction device superimposes the left-eye subtitle plane on the left-eye video plane to generate the left-eye plane.

Also, the reproduction device generates, as the right-eye subtitle plane, image data of a screen in which the upper left corner of the subtitle image is arranged in a position (x−offset, y) shifted from the display position (x, y) in the negative direction of the x-coordinate by the offset amount "offset". Then, the reproduction device superimposes the right-eye subtitle plane on the right-eye video plane to generate the right-eye plane.

Note that an image is transparent in a region where the subtitle image is not arranged in the screen corresponding to the left-eye subtitle plane and in the screen corresponding to the right-eye subtitle plane in FIGS. 1 and 2, and that the main image is arranged in a corresponding region in the screen corresponding to the left-eye plane and the right-eye plane.

When the left-eye plane and the right-eye plane are generated in a manner described above, the screen for left eye is displayed on a display device based on the left-eye plane so as to be shown to a left eye of a user, and the screen for right eye is displayed on the display device based on the right-eye plane so as to be shown to a right eye of the user. Accordingly, the user can view a 3D main image combined with a 3D subtitle.

For example, as shown in FIG. 3A, when the subtitle image for left eye is shifted in the right direction by the offset amount "offset" and the subtitle image for right eye is shifted in the left direction by the offset amount "offset", a focal position is shifted frontward (user side) in relation to a display device surface, causing the subtitle image to appear to pop out.

On the other hand, as shown in FIG. 3B, when the subtitle image for left eye is shifted in the left direction by the offset amount "offset" and the subtitle image for right eye is shifted in the right direction by the offset amount "offset", the focal position is shifted backward in relation to the display device surface, causing the subtitle image to appear to recede. Note that FIGS. 3A and 3B illustrate a user viewing the image displayed on the display device, when seen from above.

As a reproduction device that reproduces a 3D content, there has also been a device that combines and displays a 3D main image with a telop (for example, see Japanese Unexamined Patent Application Publication No. 10-327430).

SUMMARY

With the reproduction device described above, a display state of a subtitle image such as color, transparency, and position in the depth direction, which is a direction vertical to a screen, of a subtitle has not been changed in response to the volume of or change in sound corresponding to a main image which is combined with the subtitle image.

Thus, it is desirable to display a subtitle with increased effect by changing, in response to the volume of or change in sound corresponding to a main image, a display state of a subtitle image with which the main image is combined.

It is desirable to display a sub-image such as a 3D subtitle with increased effect.

Accordingly, there is disclosed a processing device for adding a subtitle to a three-dimensional (3D) image produced by left-eye and right-eye display patterns displayed on a display. The processing device may include a video decoder configured to receive video content data representing content left-eye and content right-eye display patterns. The processing device may also include an audio decoder configured to receive sound data indicative of an audio volume level. Additionally, the processing device may include a subtitle decoder configured to receive subtitle data indicative of a subtitle display pattern, and modify the subtitle data based on the sound data. The processing device may also include a superimposition unit configured to combine the modified subtitle data with the video content data to create combined pattern data representing combined left-eye and combined right-eye display patterns.

There is also disclosed a method for adding a subtitle to a three-dimensional (3D) image produced by left-eye and right-eye display patterns displayed on a display. The method may include receiving video content data representing content left-eye and content right-eye display patterns. The method may also include receiving sound data indicative of an audio volume level. Additionally, the method may include receiving subtitle data indicative of a subtitle display pattern. The method may also include modifying the subtitle data based on the sound data. In addition, the method may include combining the modified subtitle data with the video content data to create combined pattern data representing combined left-eye and combined right-eye display patterns.

Consistent with an embodiment of the present invention, a sub-image such as a 3D subtitle can be displayed with increased effect.

BRIEF DESCRIPTION OF THE DRAWINGS

FIG. 2 illustrates another method of generating a left-eye plane and a right-eye plane;

DETAILED DESCRIPTION

Embodiment

Configuration Example of an Image Processing Device According to an Embodiment

Figure 1:
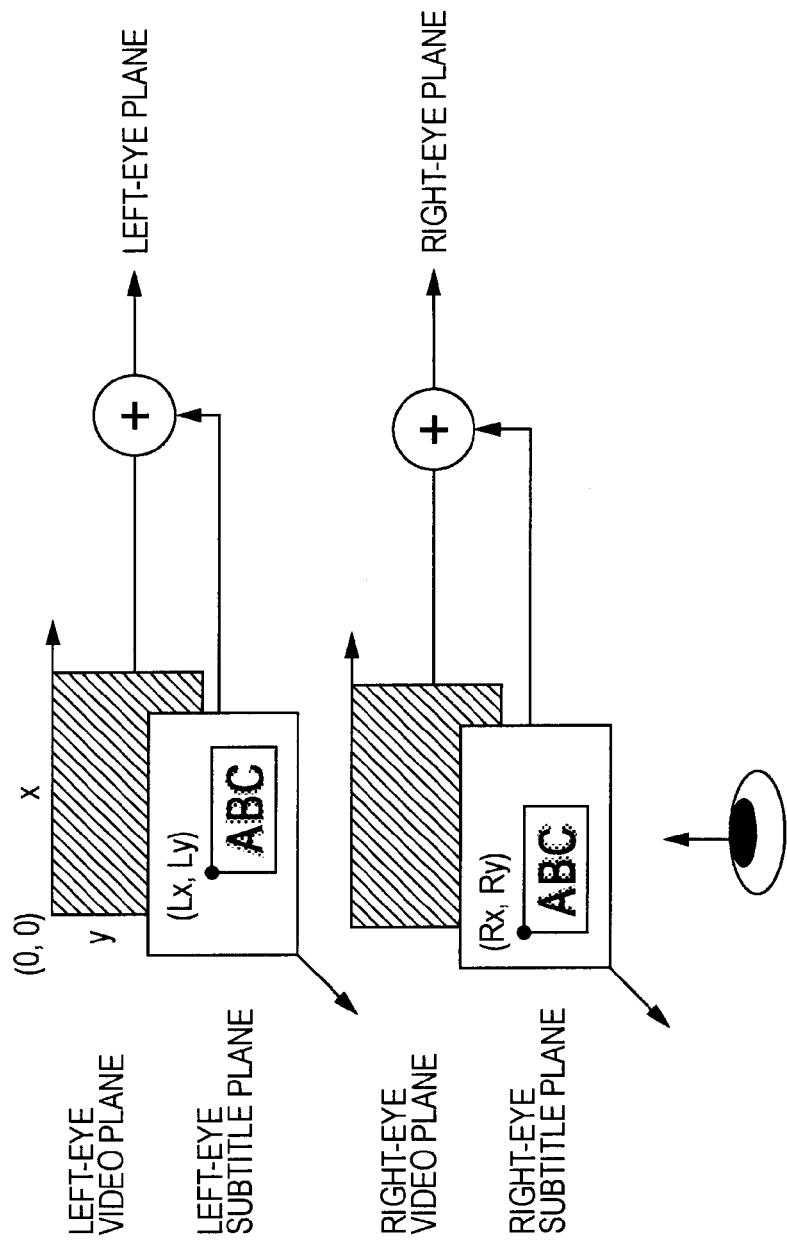
FIG. 1 illustrates a method of generating a left-eye plane and a right-eye plane.
Figure 3A:
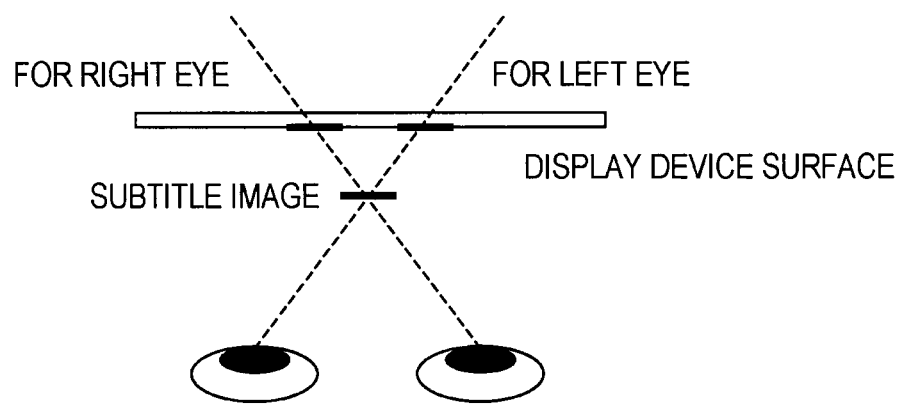
FIGS. 3A and 3B illustrate how a 3D subtitle image is viewed.
Figure 3B:
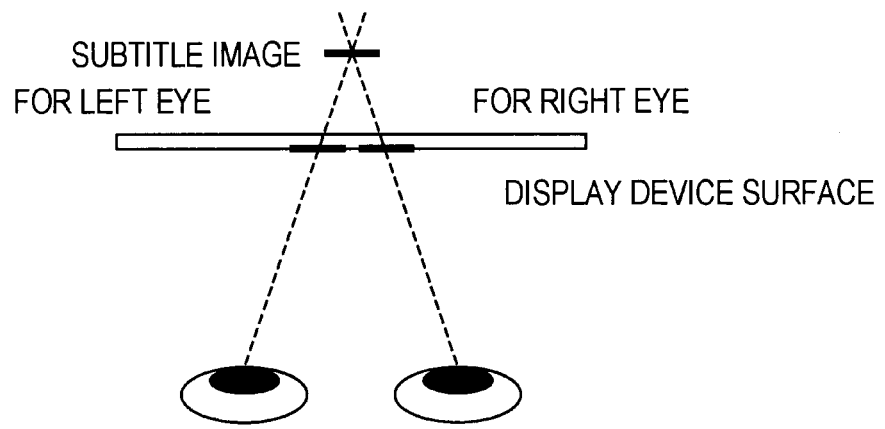
Figure 4:
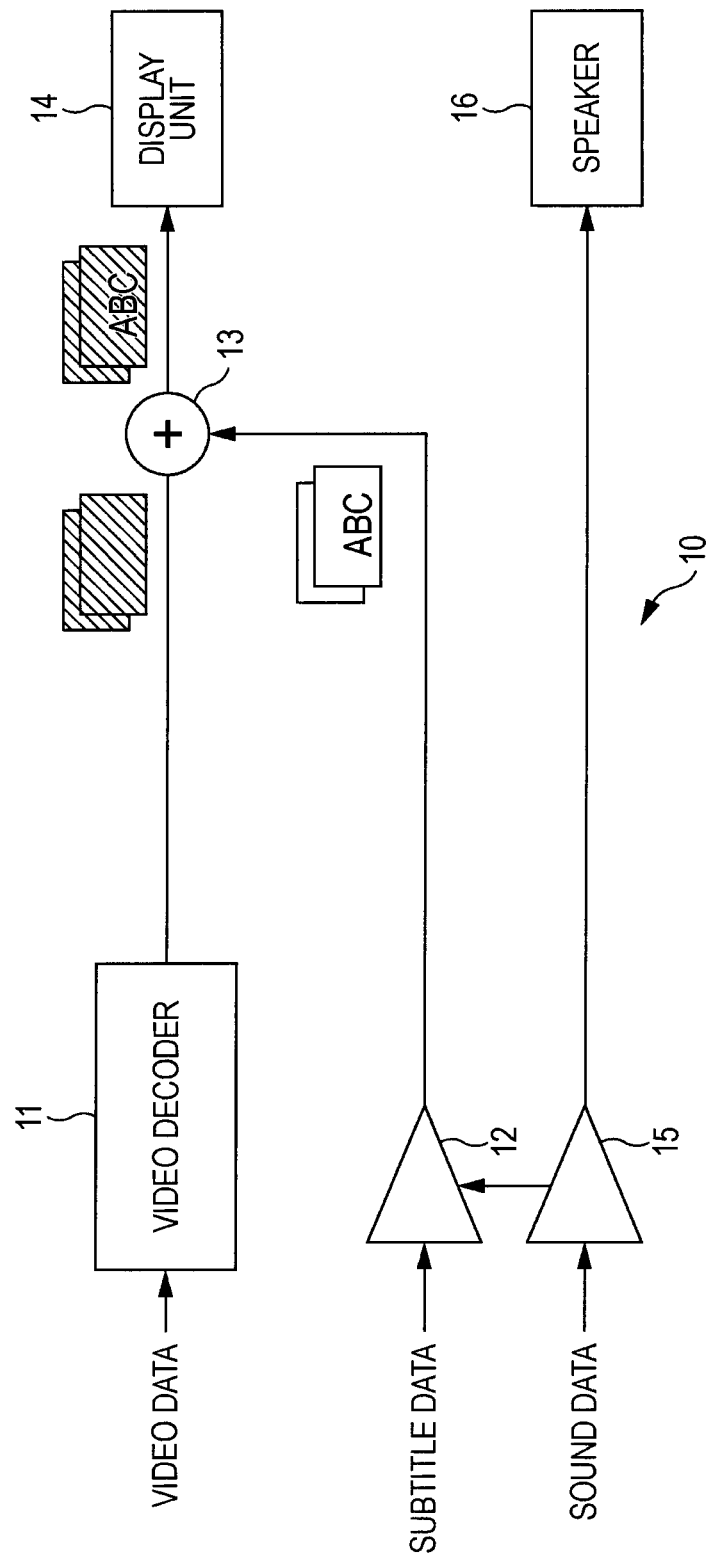
FIG. 4 is a block diagram illustrating a configuration example of an image processing device according to an embodiment of the present invention.

FIG. 4 is a block diagram illustrating a configuration example of an image processing device according to an embodiment of the present invention.

An image processing device 10 in FIG. 4 includes a video decoder 11, a subtitle decoder 12, a superimposition unit 13, a display unit 14, an audio decoder 15, and a speaker 16.

Video data of a main image for 3D display, subtitle data for 3D display, and sound data which are read from a recording medium such as a Blu-ray® Disc (BD) or received from an external device via a network or the like are inputted as 3D content data to the image processing device 10. The image processing device 10 uses the 3D content data to perform a 3D display of the main image combined with a subtitle image and to output sound corresponding to the main image.

Specifically, the video decoder 11 of the image processing device 10 decodes video content data (i.e., the inputted video data of the main image for 3D display), and supplies a resulting left-eye display pattern (i.e., a left-eye video plane) and a resulting right-eye display pattern (i.e., a right-eye video plane) to the superimposition unit 13.

The subtitle decoder 12 performs a decoding process with respect to the inputted subtitle data for 3D display (i.e., subtitle data indicative of a subtitle display pattern). Note that the subtitle data for 3D display includes subtitle data for right eye and subtitle data for left eye, and the subtitle data for each eye includes image data (for example, bitmap image data) including a pixel value of each pixel of a subtitle image for each eye, a display position of the subtitle image for each eye on a screen, and an alpha blending value representing a combination ratio of the subtitle image for each eye to the main image.

Note that the subtitle data for each eye may include a character string describing a character code of a subtitle for each eye and color information such as a palette number, instead of the image data of the subtitle image for each eye. In this case, the subtitle decoder 12 also performs a process of generating image data of the subtitle image for each eye from the character string for each eye and the color information.

Based on sound information which is information supplied from the audio decoder 15 and representing the audio volume level (i.e., the volume of sound) corresponding to the inputted sound data, the subtitle decoder 12 changes the subtitle data for 3D display obtained as a result of the decoding process. Then, based on the resulting subtitle data for 3D display, the subtitle decoder 12 generates a left-eye subtitle display pattern (i.e., a left-eye subtitle plane) and a right-eye subtitle display pattern (i.e., a right-eye subtitle plane) and supplies the planes to the superimposition unit 13. Further, the subtitle decoder 12 supplies to the superimposition unit 13 the alpha blending value for left eye included in the subtitle data for left eye and the alpha blending value for right eye included in the subtitle data for right eye.

The superimposition unit 13 superimposes the left-eye subtitle plane supplied from the subtitle decoder 12 on the left-eye video plane supplied from the video decoder 11 with the alpha blending value for left eye to generate a combined left-eye display pattern (i.e., a left-eye plane). Also, the superimposition unit 13 superimposes the right-eye subtitle plane supplied from the subtitle decoder 12 on the right-eye video plane supplied from the video decoder 11 with the alpha blending value for right eye to generate a combined right-eye display pattern (i.e., a right-eye plane). Then, the superimposition unit 13 supplies the left-eye plane and the right-eye plane to the display unit 14.

The display unit 14 displays, for example, a screen for left eye and a screen for right eye in a time-sharing manner based on the left-eye plane and the right-eye plane supplied from the superimposition unit 13. At this time, for example, a user puts on shutter glasses synchronized with the switching of the screen for left eye and the screen for right eye to view the screen for left eye with only a left eye and view the screen for right eye with only a right eye. Accordingly, the user can view a 3D main image combined with a 3D subtitle.

The audio decoder 15 performs a decoding process with respect to the inputted sound data, and supplies the resulting number of bits of the sound data to the subtitle decoder 12 as the sound information. Also, the audio decoder 15 supplies the sound data obtained as a result of the decoding process to the speaker 16.

The speaker 16 outputs the sound corresponding to the sound data supplied from the audio decoder 15. Accordingly, the user can hear the sound corresponding to the image displayed by the display unit 14.

[Description of a Process of the Image Processing Device]

Figure 5:
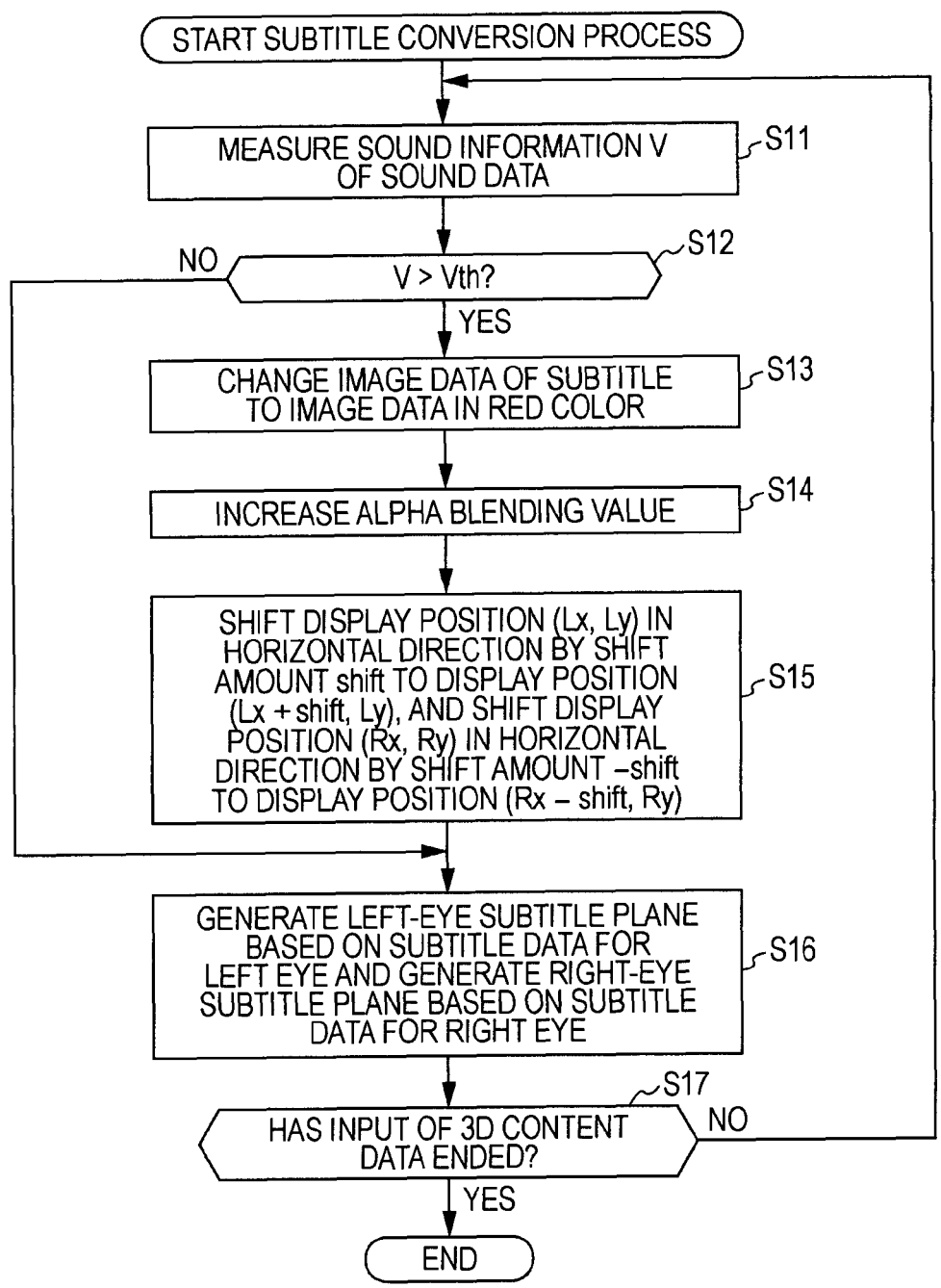
FIG. 5 is a flowchart illustrating a subtitle conversion process by the image processing device in FIG. 4.

FIG. 5 is a flowchart illustrating a subtitle conversion process by the image processing device 10 in FIG. 4. The subtitle conversion process starts, for example, when the 3D content data is inputted to the image processing device 10.

In step S11, the audio decoder 15 performs the decoding process with respect to the inputted sound data, measures the resulting number of bits of the sound data as sound information V, and supplies the sound information V to the subtitle decoder 12.

In step S12, the subtitle decoder 12 determines whether the sound information V supplied from the audio decoder 15 is greater than a volume threshold (e.g., threshold value Vth). The threshold value Vth is included in, for example, the subtitle data. The subtitle decoder 12 performs the decoding process with respect to the subtitle data for 3D display, and acquires the threshold value Vth from the resulting subtitle data for left eye or subtitle data for right eye.

When it is determined that the sound information V is greater than the threshold value Vth in step S12, process proceeds to step S13. In step S13, the subtitle decoder 12 changes image data of subtitle in the image data of the subtitle image included in the subtitle data for left eye and the subtitle data for right eye obtained as the result of the decoding process to image data in red color. Specifically, the subtitle decoder 12 changes the palette number, an RGB value, a YCbCr value, or a YPbPr value as the image data of subtitle to a value for red color. Note that the palette number is an 8-bit value when the number of colors that can be displayed is 256. The RGB value, the YCbCr value, and the YPbPr value are, for example, values of 24 (i.e., eight times three) bits.

Since the color of the subtitle is changed to red color in step S13 in this manner, a visual impression of the subtitle is strengthened.

In step S14, the subtitle decoder 12 increases the alpha blending values included in the subtitle data for left eye and the subtitle data for right eye obtained as the result of the decoding process.

Note that the alpha blending value is a value from 0 to 1; a greater alpha blending value indicates less transparency and a smaller alpha blending value indicates greater transparency. For example, when the alpha blending value is 1, image data corresponding to the alpha blending value is combined to be completely opaque. When the alpha blending value is 0, image data corresponding to the alpha blending value is combined to be completely transparent.

Thus, as a result of a process in step S14, the transparency of the left-eye subtitle plane and the right-eye subtitle plane decreases. Accordingly, the subtitle can be seen more clearly than the main image, thus strengthening the visual impression.

In step S15, the subtitle decoder 12 shifts a display position (Lx, Ly) included in the subtitle data for left eye obtained as the result of the decoding process in the horizontal direction by a shift amount "shift" corresponding to the sound information V to a display position (Lx+shift, Ly), and shifts a display position (Rx, Ry) included in the subtitle data for right eye in the horizontal direction by a shift amount "−shift" to a display position (Rx−shift, Ry). That is, the subtitle decoder 12 causes the display position of the subtitle image for left eye and the display position of the subtitle image for right eye to be further apart. Accordingly, the user can view the 3D subtitle popping out further toward the user side. After a process of step S15, the process proceeds to step S16.

On the other hand, when it is determined that the sound information V is not greater than the threshold value Vth in step S12, the process proceeds to step S16. That is, in this case, processes of steps S13 to S15 are not performed, and the subtitle data for left eye and the subtitle data for right eye obtained as the result of the decoding process are not changed.

In step S16, the subtitle decoder 12 generates the left-eye subtitle plane based on the subtitle data for left eye changed in steps S13 to S15 or the subtitle data obtained as the result of the decoding process, and generates the right-eye subtitle plane based on the subtitle data for right eye changed in steps S13 to S15 or the subtitle data obtained as the result of the decoding process.

In step S17, the audio decoder 15 determines whether input of the 3D content data has ended, e.g., whether the sound data is no longer inputted. When it is determined that the input of the 3D content data has not ended in step S17, the process returns to step S11 and subsequent processes are performed.

On the other hand, when it is determined that the input of the 3D content data has ended in step S17, the process is terminated.

The subtitle conversion process illustrated in FIG. 5 is performed in a manner described above. Accordingly, when the volume of sound is great, the color of a subtitle to be displayed simultaneously with the sound is changed to red with decreased transparency and displayed to pop out toward the user side. That is, when the volume of the sound increases, the subtitle is highlighted. Thus, the user can further enjoy a change in sound. Thus, the image processing device 10 can display a 3D subtitle with increased effect.

Another Embodiment

Figure 6:
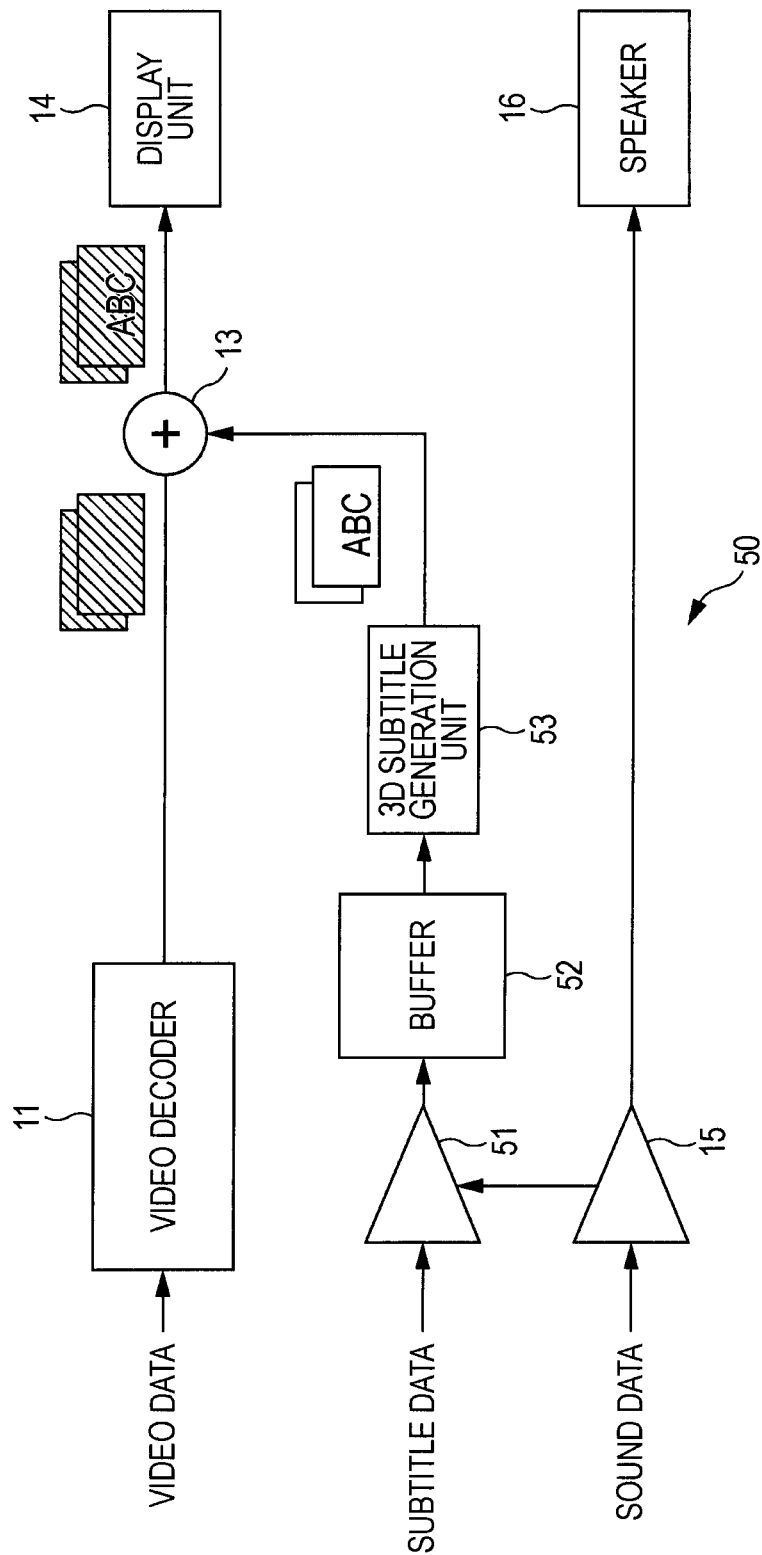
FIG. 6 is a block diagram showing a configuration example of an image processing device according to another embodiment of the present invention.

Configuration Example of an Image Processing Device According to Another Embodiment FIG. 6 is a block diagram showing a configuration example of an image processing device according to another embodiment of the present invention.

In FIG. 6, components identical to those in FIG. 4 are denoted by the same reference numerals. Redundant description is omitted accordingly.

The configuration of an image processing device 50 in FIG. 6 differs from that in FIG. 4 mainly in that a subtitle decoder 51 is provided instead of the subtitle decoder 12 and that a buffer 52 and a 3D subtitle generation unit 53 are newly provided.

Instead of the subtitle data for 3D display, subtitle data for 2D display to which an offset amount "offset" and offset directions for left eye and right eye are added as offset information is inputted to the image processing device 50 in FIG. 6. Note that an offset direction refers to one horizontal (left or right) direction, and the offset direction for left eye and the offset direction for right eye are opposite directions. The subtitle data for 2D display includes image data of a subtitle image for 2D display, a display position of the subtitle image for 2D display on a screen, and an alpha blending value for the subtitle image for 2D display.

The subtitle decoder 51 performs a decoding process with respect to the inputted subtitle data for 2D display. Based on sound information supplied from the audio decoder 15, the subtitle decoder 51 changes the subtitle data for 2D display obtained as a result of the decoding process and the offset information which is added to the subtitle data for 2D display. Then, the subtitle decoder 51 associates the subtitle data for 2D display and the offset information after change and supplies the data and information to the buffer 52. The buffer 52 associates and temporarily holds the subtitle data for 2D display and the offset information supplied from the subtitle decoder 51.

The 3D subtitle generation unit 53 reads the subtitle data for 2D display and the offset information from the buffer 52. The 3D subtitle generation unit 53 shifts the display position included in the read subtitle data for 2D display in the offset direction for left eye and the offset direction for right eye included in the offset information each by the offset amount. The 3D subtitle generation unit 53 generates image data of screens in which the subtitle image for 2D display is arranged in resulting display positions as a left-eye subtitle display pattern (i.e., a left-eye subtitle plane) and a right-eye subtitle display pattern (i.e., a right-eye subtitle plane). Then, the 3D subtitle generation unit 53 supplies the left-eye subtitle plane and the right-eye subtitle plane to the superimposition unit 13. Further, the 3D subtitle generation unit 53 supplies the alpha blending value included in the subtitle data for 2D display to the superimposition unit 13 as the alpha blending value for left eye and right eye.

Since the image processing device 50 performs a 3D display of a subtitle using subtitle data for 2D display in a manner described above, there is compatibility with a related-art device that does not support 3D display of a subtitle.

Note that the buffer 52 may not be provided in the image processing device 50.

[Description of a Process of the Image Processing Device]

Figure 7:
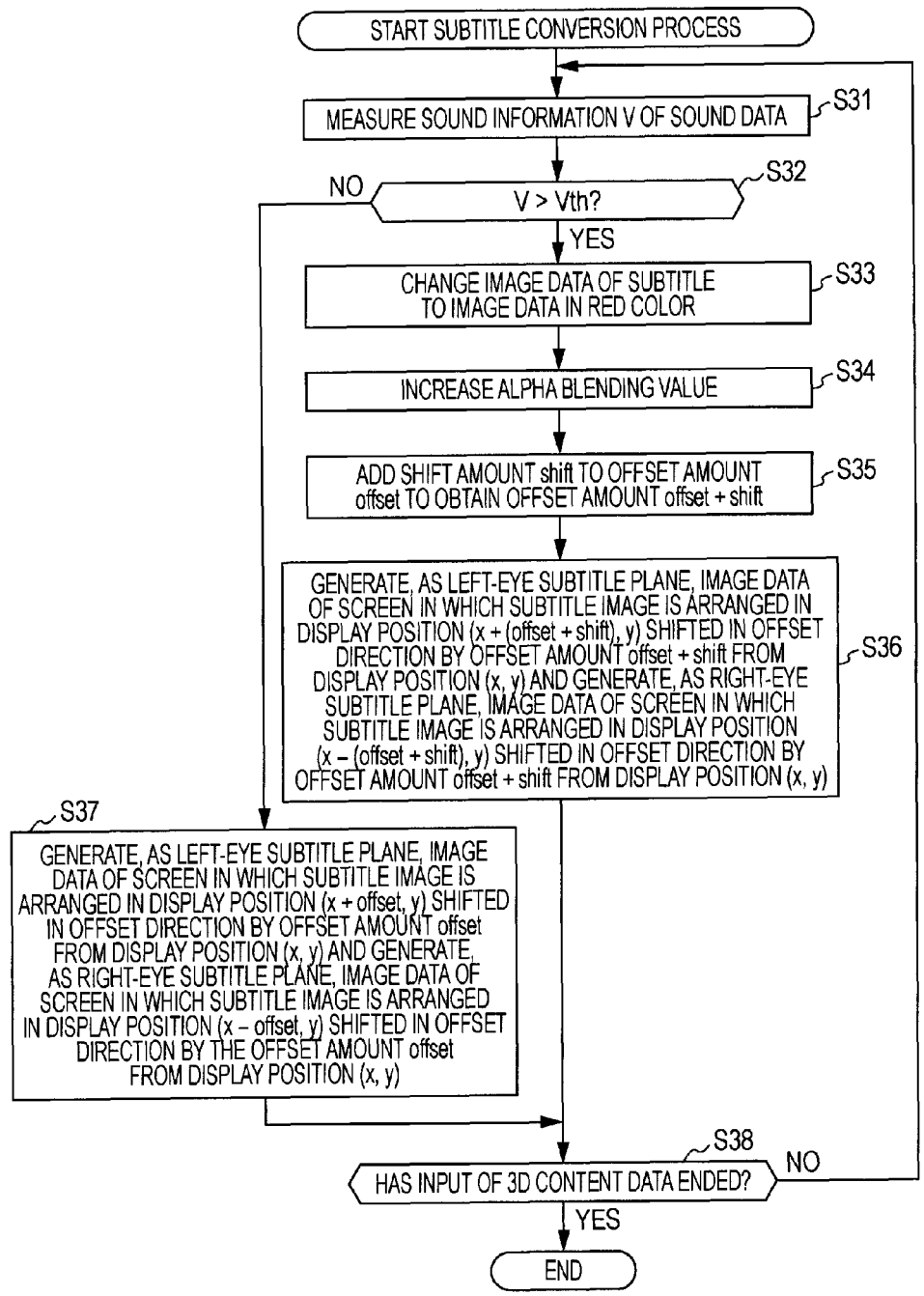
FIG. 7 is a flowchart illustrating a subtitle conversion process by the image processing device in FIG. 6.

FIG. 7 is a flowchart illustrating a subtitle conversion process by the image processing device 50 in FIG. 6. The subtitle conversion process starts, for example, when 3D content data is inputted to the image processing device 50.

Since processes of steps S31 and S32 in FIG. 7 are similar to those of steps S11 and S12 in FIG. 5, description thereof is omitted.

When it is determined that the sound information V is greater than the threshold value Vth in step S32, the subtitle decoder 51 changes image data of subtitle in the image data of the subtitle image included in the subtitle data for 2D display obtained as the result of the decoding process to image data in red color in step S33.

In step S34, the subtitle decoder 51 increases the alpha blending value included in the subtitle data for 2D display obtained as the result of the decoding process.

In step S35, the subtitle decoder 51 adds the shift amount "shift" corresponding to the sound information V to the offset amount "offset" included in the offset information added to the subtitle data for 2D display to obtain an offset amount "offset+shift". That is, the subtitle decoder 51 shifts the display position of a subtitle image for left eye and the display position of a subtitle image for right eye in the offset direction for each eye by the shift amount "shift". Then, the subtitle decoder 51 supplies the subtitle data for 2D display changed in steps S33 and S34 and the offset information in which the offset amount "offset" is changed to the offset amount "offset+shift" to the buffer 52 so as to be held.

In step S36, the 3D subtitle generation unit 53 reads the subtitle data for 2D display and the offset information from the buffer 52, and generates, as the left-eye subtitle plane, image data of a screen in which the subtitle image is arranged in a display position (x+(offset+shift), y) shifted in the offset direction by the offset amount "offset+shift" included in the offset information from a display position (x, y) included in the subtitle data for 2D display.

Also, the 3D subtitle generation unit 53 generates, as the right-eye subtitle plane, image data of a screen in which the subtitle image is arranged in a display position (x−(offset+shift), y) shifted in the offset direction by the offset amount "offset+shift" included in the offset information from the display position (x, y). Then, the 3D subtitle generation unit 53 supplies the left-eye subtitle plane and the right-eye subtitle plane to the superimposition unit 13, and supplies the alpha blending value included in the subtitle data for 2D display and changed in step S34 to the superimposition unit 13 as the alpha blending values for left eye and right eye.

On the other hand, when it is determined that the sound information V is not greater than the threshold value Vth in step S32, the 3D subtitle generation unit 53 reads the subtitle data for 2D display and the offset information from the buffer 52 and generates, as the left-eye subtitle plane, image data of a screen in which the subtitle image is arranged in a display position (x+offset, y) shifted in the offset direction by the offset amount "offset" included in the offset information from the display position (x, y) included in the subtitle data for 2D display in step S37.

Also, the 3D subtitle generation unit 53 generates, as the right-eye subtitle plane, image data of a screen in which the subtitle image is arranged in a display position (x−offset, y) shifted in the offset direction by the offset amount "offset" included in the offset information from the display position (x, y). Then, the 3D subtitle generation unit 53 supplies the left-eye subtitle plane and the right-eye subtitle plane to the superimposition unit 13, and supplies the alpha blending value included in the subtitle data for 2D display to the superimposition unit 13 as the alpha blending values for left eye and right eye.

After a process of step S36, or after a process of step 37 when it is determined that the sound information V is not greater than the threshold value Vth in step S32, the process proceeds to step S38. Since a process of step S38 is similar to that of step S17 in FIG. 5, description thereof is omitted.

The subtitle conversion process in FIG. 7 is performed in a manner described above. Accordingly, when the volume of sound is great, the color of a subtitle to be displayed simultaneously with the sound is changed to red with decreased transparency and displayed to pop out toward the user side. That is, when the volume of the sound increases, the subtitle is highlighted. Thus, a user can further enjoy a change in sound. Therefore, the image processing device 50 can display a 3D subtitle with increased effect.

Note that, all of the color, transparency, and position in the depth direction of the subtitle are changed when the volume of the sound is great in the subtitle conversion processes illustrated in FIG. 5 or 7 described above. However, at least one of the color, transparency, and position in the depth direction of the subtitle may be changed. Further, the resultant color, transparency, and position in the depth direction of the subtitle after change are not limited to what is described above.

Further, a display state of a subtitle image to be changed when the volume of sound is great is not limited to color, transparency, and position in the depth direction of a subtitle. For example, the position of a 3D subtitle in the horizontal direction may be changed when the volume of sound is great.

Although only one threshold value for the sound information V is provided in the subtitle conversion process illustrated in FIG. 5 or 7 described above, a plurality of threshold values may be provided. In such case, the degree of change in color or transparency of a subtitle after a change may be varied according to a value of the sound information V. For example, the color or transparency of a subtitle after the change may be changed in a stepwise manner according to a value of the sound information V. Note that the shift amount "shift" may be fixed to a constant amount instead of being set corresponding to the sound information V.

Further, although the display state of the subtitle image is changed in response to a value of the sound information V in the description above, a display state of a subtitle image may be changed in response to a change in the value of the sound information V. For example, a display state of a subtitle image is changed when an increase or decrease in volume is extreme (i.e., when a difference between a first volume level and a second volume level exceeds a volume change threshold).

A subtitle image may be an image of a subtitle in a unit of single character instead of being an image having a rectangular region including an entire subtitle to be displayed in one screen.

Further, although the offset information is added to the subtitle data for 2D display and supplied in the description above, the offset information may be stored in advance in a storage unit (not illustrated) in the image processing device 10 (50). In this case, the position of a 3D subtitle in the depth direction is fixed to be constant.

The embodiments of the present invention described above can be applied not only to a case where a main image is combined with a subtitle image but also to a case where a main image is combined with a sub-image (for example, a menu image) other than a subtitle image.

[Description of a Computer According to an Embodiment of the Present Invention]

A sequence of processes described above can be performed with hardware or can be performed with software. When the sequence of processes is performed with software, a program included in the software is installed in a general-purpose computer or the like.

Figure 8:
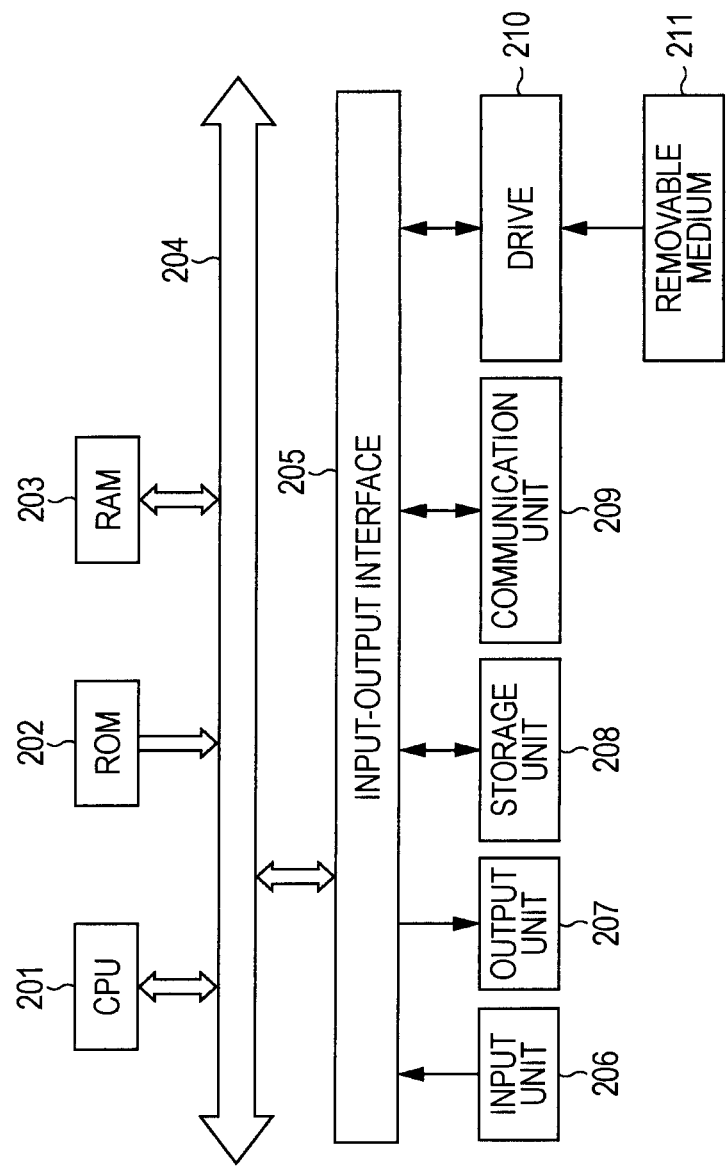
FIG. 8 illustrates a configuration example of a computer according to an embodiment.

FIG. 8 shows a configuration example of a computer according to an embodiment in which a program to execute the sequence of processes described above is to be installed.

The program can be recorded in advance in a storage unit 208 as a recording medium built in the computer or a read only memory (ROM) 202.

Alternatively, the program can be stored (recorded) in a removable medium 211. The removable medium 211 can be provided as a so-called software package. Examples of the removable medium 211 include a flexible disk, a compact disc read only memory (CD-ROM), a magneto optical (MO) disk, a digital versatile disc (DVD), a magnetic disk, and a semiconductor memory.

Note that the program can be downloaded to the computer via a communication network or broadcast network and installed in the built-in storage unit 208 instead of being installed in the computer from the removable medium 211 described above via a drive 210. That is, for example, the program can be transferred through wireless communication to the computer from a download site via a satellite for digital satellite broadcasting or can be transferred through wired communication to the computer via a network such as a local area network (LAN) or the Internet.

The computer includes a central processing unit (CPU) 201. The CPU 201 is connected to an input-output interface 205 via a bus 204.

When a user inputs an instruction via the input-output interface 205 by operating an input unit 206 or the like, the CPU 201 accordingly executes the program stored in the ROM 202. Alternatively, the CPU 201 loads a program stored in the storage unit 208 to a random access memory (RAM) 203 and executes the program.

Accordingly, the CPU 201 performs processes according to the flowcharts described above or performs processes to be executed with configurations illustrated in the above block diagrams. The CPU 201 causes the result of a process to be, for example, outputted from an output unit 207, transmitted from a communication unit 209, or stored in the storage unit 208 as necessary via the input-output interface 205.

The input unit 206 includes a keyboard, a mouse, and a microphone. The output unit 207 includes a liquid crystal display (LCD) and a speaker.

In this specification, processes to be performed by the computer according to the program may or may not be performed chronologically in the order stated in the flowchart. That is, the processes to be performed by the computer according to the program may include a process executed in parallel or individually (for example, process using parallel processing or an object).

The program may be executed by one computer (processor) or may be executed by distributed processing using a plurality of computers. Further, the program may be transferred to and executed by a remote computer.

Further, embodiments of the present invention are not limited to those described above, and various modifications are possible within the scope of the present invention.

What is claimed is:

1. A processing device for adding a subtitle to a three-dimensional (3D) image produced by left-eye and right-eye display patterns displayed on a display, comprising:
    a video decoder configured to receive video content data representing content left-eye and content right-eye display patterns;
    an audio decoder configured to receive sound data indicative of an audio volume level;
    a subtitle decoder configured to:
        receive subtitle data indicative of a subtitle display pattern;
        compare the volume level to a volume threshold; and
        when the volume level exceeds the volume threshold, modify the subtitle data based on the sound data such that the modified subtitle data is indicative of a subtitle display pattern different from the subtitle display pattern indicated by the received subtitle data; and
    a superimposition unit configured to combine the modified subtitle data with the video content data to create combined pattern data representing combined left-eye and combined right-eye display patterns.

2. The processing device of claim 1, wherein the subtitle data is indicative of the volume threshold.

3. The processing device of claim 1, wherein the volume threshold is a first volume threshold and wherein the subtitle decoder is configured to:
    compare the volume level to a second volume threshold that is higher than the first volume threshold;
    modify the subtitle data in a first way when the volume level exceeds the first volume threshold but does not exceed the second volume threshold; and
    modify the subtitle data in a second way when the volume level exceeds the second volume threshold.

4. The processing device of claim 1, wherein:
    the volume level is a first volume level;
    the sound data is also indicative of a second volume level; and
    the subtitle decoder is configured to:
        compare a difference between the first volume level and the second volume level to a volume change threshold; and
        modify the subtitle data when the difference between the first volume level and the second volume level exceeds the volume change threshold.

5. The processing device of claim 1, wherein modifying the subtitle data includes changing a color of the subtitle display pattern.

6. The processing device of claim 1, wherein:
the subtitle data is also indicative of a blending value for controlling a transparency of a subtitle 3D image in a combined 3D image produced by display of the combined left-eye and combined right-eye display patterns; and
modifying the subtitle data includes modifying the blending value.

7. The processing device of claim 1, wherein:
the subtitle data is also indicative of a position value for controlling a position of a subtitle 3D image in a combined 3D image produced by display of the combined left-eye and combined right-eye display patterns; and
modifying the subtitle data includes modifying the position value.

8. The processing device of claim 7, wherein the position value controls a depth of the subtitle 3D image in the combined 3D image.

9. The processing device of claim 7, wherein:
the subtitle display pattern is a subtitle left-eye display pattern;
the subtitle data is also indicative of a subtitle right-eye display pattern;
the position value is a first position value for controlling a position of the subtitle left-eye display pattern in the combined left-eye display pattern;
the subtitle data is also indicative of a second position value for controlling a position of the subtitle right-eye display pattern in the combined right-eye display pattern; and
modifying the subtitle data includes modifying the first and second position values.

10. The processing device of claim 1, further including a 3D subtitle generation unit configured to generate subtitle left-eye and subtitle right-eye display patterns based on the subtitle display pattern, wherein the superimposition unit is configured to:
superimpose the subtitle left-eye display pattern on the content left-eye display pattern to create the combined left-eye display pattern; and
superimpose the subtitle right-eye display pattern on the content right-eye display pattern to create the combined right-eye display pattern.

11. A method for adding a subtitle to a three-dimensional (3D) image produced by left-eye and right-eye display patterns displayed on a display, comprising:
receiving video content data representing content left-eye and content right-eye display patterns;
receiving sound data indicative of an audio volume level;
receiving subtitle data indicative of a subtitle display pattern;
comparing the audio volume level to a volume threshold; and
when the audio volume level exceeds the volume threshold:
modifying the subtitle data based on the sound data such that the modified subtitle data is indicative of a subtitle display pattern different from the subtitle display pattern indicated by the received subtitle data; and
combining the modified subtitle data with the video content data to create combined pattern data representing combined left-eye and combined right-eye display patterns.

\* \* \* \* \*